United States Patent [19]
Deaver

[11] Patent Number: 5,586,772
[45] Date of Patent: Dec. 24, 1996

[54] RETROFIT GASKET ASSEMBLY FOR RAILROAD HOPPER HAVING REINFORCING PORTIONS

[75] Inventor: Ralph Deaver, Waverly, Tenn.

[73] Assignee: Central Sales & Service, Inc., Waverly, Tenn.

[21] Appl. No.: 546,278

[22] Filed: Oct. 20, 1995

[51] Int. Cl.$^6$ .................................................. F16J 15/10
[52] U.S. Cl. ..................... 277/166; 277/183; 277/184; 277/226; 49/498.1
[58] Field of Search ..................... 277/166, 183, 277/184, 178, 201, 226, 228, 229; 49/490.1, 498.1, 493.1

[56] References Cited

U.S. PATENT DOCUMENTS

| | | | |
|---|---|---|---|
| 2,679,667 | 6/1954 | Angus | 49/498.1 |
| 3,159,886 | 12/1964 | Lynch | 49/498.1 |
| 3,952,455 | 4/1976 | McAlarney | 49/498.1 |
| 4,419,844 | 12/1983 | Kreisfeld | 49/498.1 |
| 4,998,946 | 3/1991 | Nozaki | 49/498.1 |
| 5,127,193 | 7/1992 | Okada et al. | 49/498.1 |
| 5,277,384 | 1/1994 | Webb | 277/226 |

FOREIGN PATENT DOCUMENTS

| | | | |
|---|---|---|---|
| 711051 | 6/1965 | Canada | 49/498.1 |
| 590836 | 4/1994 | European Pat. Off. | 49/498.1 |

*Primary Examiner*—Scott Cummings

[57] ABSTRACT

A gasket assembly includes an elongate flexible seal having opposite top and bottom edges. A portion of the seal adjacent to the top edge presenting a generally bulbous configuration. Another portion of the seal adjacent to the top edge presents a generally planar configuration. The bottom edge of the seal contains a channel. A rigid support member has a top portion which is received within the channel of the seal.

7 Claims, 2 Drawing Sheets

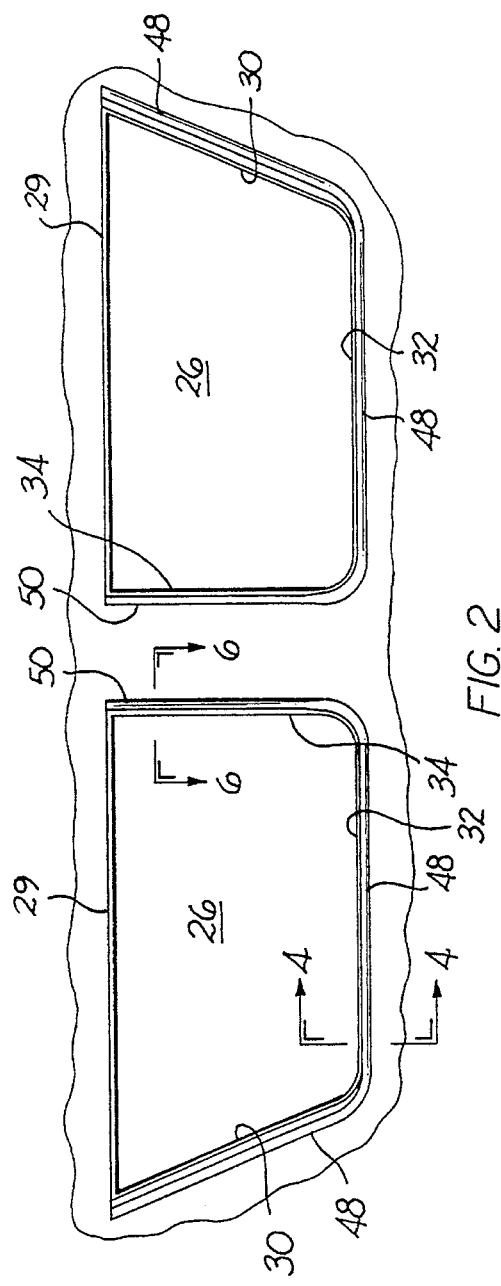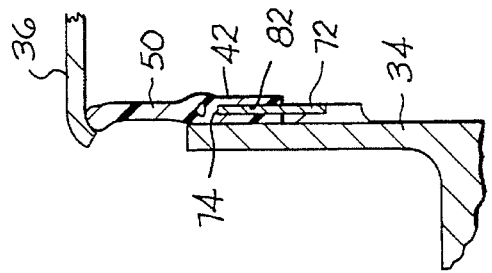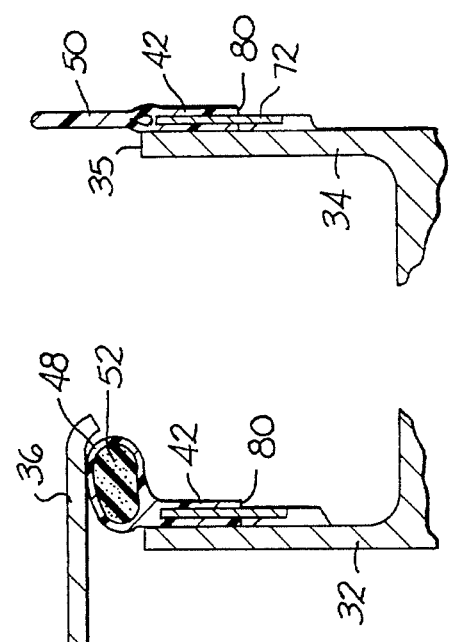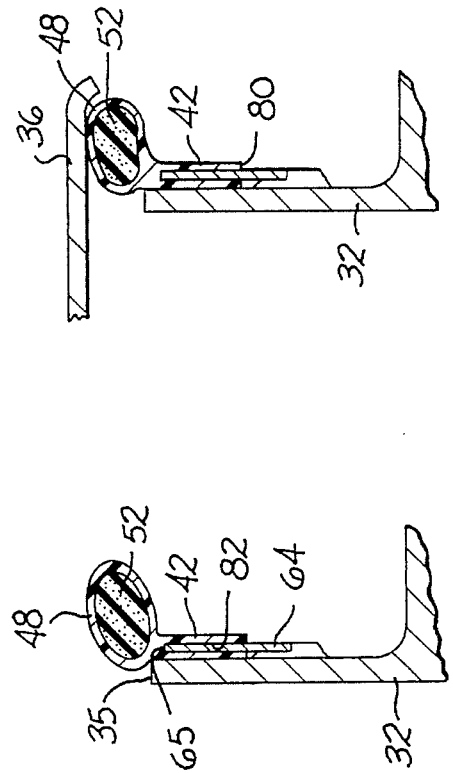

RETROFIT GASKET ASSEMBLY FOR RAILROAD HOPPER HAVING REINFORCING PORTIONS

BACKGROUND OF THE INVENTION

The invention pertains to a gasket assembly to seal an opening. More specifically, the invention concerns a retrofit gasket assembly suitable for providing an effective seal between an opening and its associated door in a railroad hopper car.

In some styles of railroad hopper cars, the contents of the car are off-loaded by means of a selectively closable opening in the bottom of the car. A hinged door closes the opening when off-loading is not desirable. The door is open to permit off-loading of the contents of the railroad car.

A railroad hopper car carries a variety of materials over the course of its useful life. As the railroad hopper car becomes older, the integrity of the original seal between the bottom opening and the door decreases to a point where there are leaks in the seal, or at least there is an increase in the potential for leaks. This is especially true in the case where rain enters the hopper car so as to cause the residual contents to drain toward the bottom opening. Unless there is a seal with integrity between the opening and the door, there exists the possibility that the contents of the hopper car will drain onto the ground adjacent the car. Such drainage is an undesirable occurrence.

Thus, it would be desirable to provide a gasket assembly to retrofit the seal between the opening and its associated hinged door of a railroad hopper car.

SUMMARY OF THE INVENTION

It is a principal object of the invention to provide an improved gasket assembly to retrofit the seal between the opening and its associated hinged door of a railroad hopper car.

In one form, the invention is a gasket assembly for sealing the flanged opening in the bottom of a railroad car wherein the assembly comprises an elongate flexible seal that has a top sealing portion and a bottom channel. A plurality of elongate rigid support members attach to the flexible seal at the channel. The top sealing portion of the flexible seal presents a bulbous shape over a portion of its length corresponding to one of the support members, and a planar shape over a portion of its length corresponding to another of the support members.

BRIEF DESCRIPTION OF THE DRAWINGS

The following drawings form a part of this patent application, and a brief description of these drawings is set forth below:

FIG. 2 is a bottom view of the bottom two openings in a railroad hopper car with a specific embodiment of the gasket assembly of the invention attached about the openings and the door in an open position;

FIG. 4 is a cross-sectional view taken along section line 4—4 of FIG. 2;

FIG. 5 is the same cross-sectional view taken along section line 4—4 of FIG. 2 except that the door is closed down upon the gasket;

FIG. 6 is a cross-sectional view taken along section line 6—6 of FIG. 2; and

FIG. 7 is the same cross-sectional view taken along section line 6—6 of FIG. 2 except that the door is closed down upon the gasket.

DETAILED DESCRIPTION OF A SPECIFIC EMBODIMENT

Figure 1:
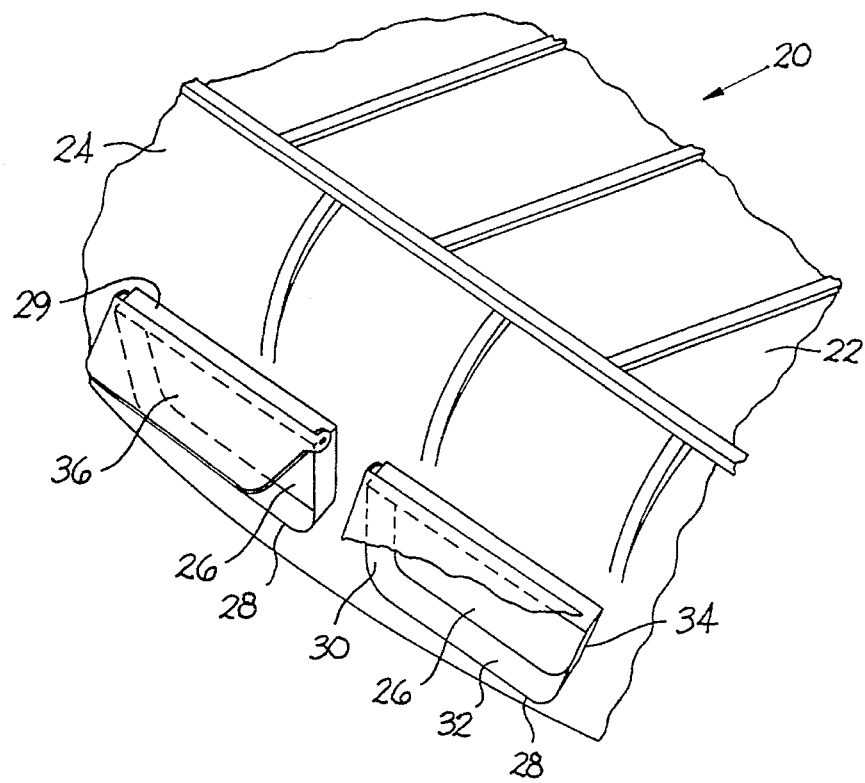
FIG. 1 is a perspective view illustrating the bottom surface and side surface of a railroad hopper car wherein the bottom surface contains two openings with open doors hingedly affixed thereat.
Figure 3:
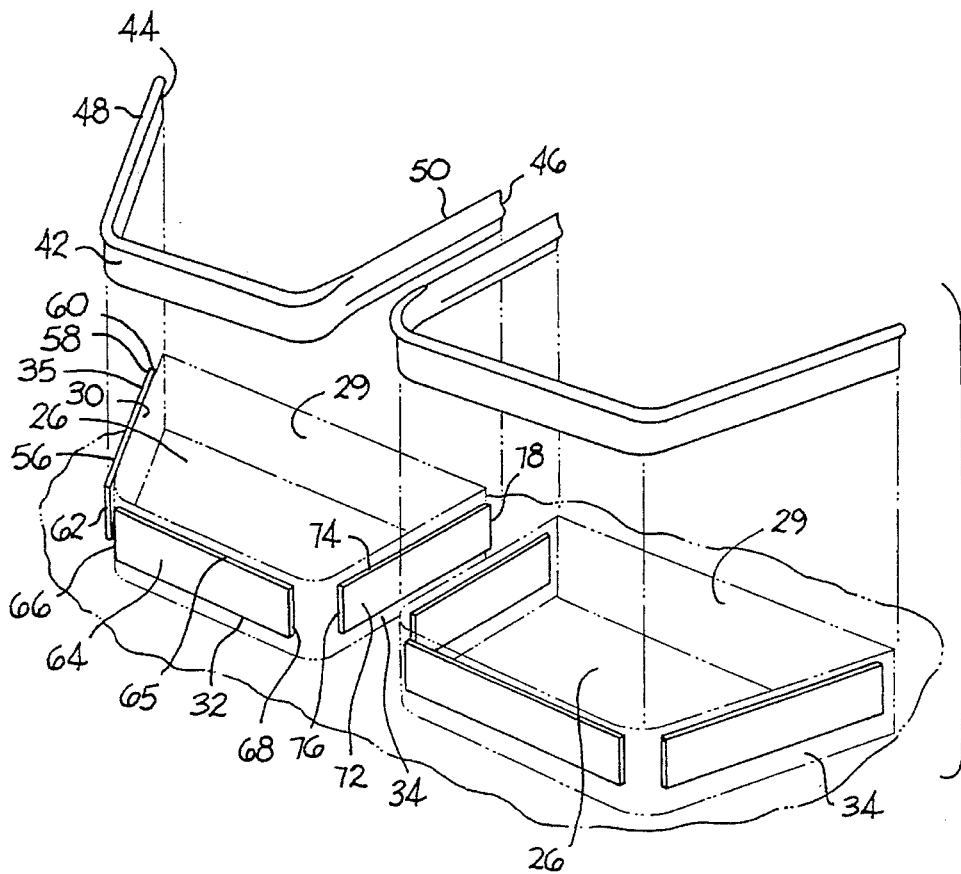
FIG. 3 is a perspective view of the gasket assembly of FIG. 2 wherein the seals are shown exploded away from the supports.

Referring to the drawings, there is illustrated a in perspective view a portion of a railroad hopper car generally designated as 20. The railroad hopper car 20 has a side surface 22 and a bottom surface 24. Bottom surface 24 contains a pair of openings 26. Each opening 26 is the same so that a description of one opening 26 will suffice for that of the other opening.

Opening 26 is bounded at its periphery by an upstanding flange 28. Flange 28 includes four sections; namely, a rear flange section 29, one side flange section 30 that is disposed at an acute angle with respect to the rear flange section 29, a front flange section 32 that is generally parallel to the rear flange section 29, and another side flange section 34 that is disposed generally perpendicular to the rear flange section 29. The flange 28 includes a top edge 35 that extends about the entire flange 28.

A door 36 hingedly connects adjacent the rear flange portion 29. The door 36 is of the same general configuration as the opening. Although not illustrated, a latching assembly selectively secures the door 36 in a closed position.

The gasket assembly includes a flexible rubber gasket 42 having opposite end 44 and 46. The gasket 42 has sections that correspond to the front flange section 32 and the two side flange portion (30,34). More specially, the length of the gasket 42 that is to seal against the one (acute) side flange section 30 and the front flange section 32 has a generally elliptically shaped bulb 48 which defines a volume that contains a foam-like material 52. The length of the gasket 42 that is to seal against the other (normal) side flange section 34 presents an upstanding planar portion 50 of the rubber gasket material.

The gasket assembly further includes a trio of support members. One side support member 56 has a top edge 58 and opposite side edges 60 and 62. The front support member 64 has a top edge 65 and opposite side edges 66 and 68. The other side support member 72 has a top edge 74 and opposite side edges 76 and 78.

The bottom edge 80 of the rubber gasket 42 contains a channel 82 therein. Channel 82 receives the top portion, along with the top edges, of the three support members (56, 64, 72). The side support members (56, 64, 72) are attached, such as by welding, to the external surface of the flanges so that the rubber gasket extends above and about the top edge of the flanges.

When the door 36 is closed, the interior surface of the door 36 impinges against the upper part of the gasket so as to compress the gasket and thereby seal between the door and the flange.

In the case of the length of the rubber gasket 42 that presents the bulb 48, the door 36 compresses the bulb 48 so as to create an effective seal between the door 36 and the flange that surrounds the opening. FIG. 4 illustrates this length of the gasket in cross-section with the door in an open condition. FIG. 5 illustrates this length of the gasket in the condition in which the door is closed so as to compress the bulb. The degree of compression may vary so that it may be more or less than as illustrated in FIG. 5, but the compression is to such an extent so as to create an effective seal.

In the case of the length of the rubber gasket 42 that presents the planar portion 50, the door 36 compresses the planar portion 50 so as to create an effective seal between the door 36 and the flange that surrounds the opening. FIG. 6 illustrates this length of the gasket in cross-section with the door in an open condition. FIG. 7 illustrates this length of the gasket in the condition in which the door is closed so as to compress the planar portion 50. The degree of compression of the planar portion 50 may vary so that it may be more or less than as illustrated in FIG. 7, but the compression is to such an extent so as to create an effective seal.

It can thus be seen that the present invention provides a seal assembly for the opening and its associated hinged door so as to effectively seal between the flange that defines the opening and the door. This seal assembly can be retrofitted onto an older railroad hopper car so as to increase the integrity of the seal at the bottom opening of the railroad hopper car.

What is claimed is:

1. A gasket assembly for sealing the flanged opening in the bottom of a railroad car, the assembly comprising;

an elongate flexible seal, the seal having a top sealing portion, the seal further including a bottom channel;

a plurality of elongate rigid support members, the support members attach to the flexible seal at the channel; and the top sealing portion presenting a bulbous shape over a portion of its length corresponding to one of the support members, and the top sealing portion presenting a planar shape over a portion of its length corresponding to another of the support members.

2. The gasket assembly of claim 1 wherein the flanged opening presents a flange defined by a plurality of flange sections, the flange sections comprise a rear flange section, an acute side flange section which is disposed at an acute included angle relative to the rear flange section, a perpendicular side flange section which is generally perpendicular to the rear flange section, and a front flange section which is generally parallel to the rear flange section.

3. The gasket assembly of claim 2 wherein the plurality of rigid support members includes an acute side rigid support member which attaches to the acute side flange section, a perpendicular side rigid support member which attaches to the perpendicular side flange section, and a front rigid support member which attaches to the front flange section.

4. The gasket assembly of claim 2 wherein the top sealing portion of the seal with the bulbous shape is over a portion of its length corresponding to the acute side rigid support member and the front rigid support member.

5. The gasket assembly of claim 4 wherein the top sealing portion of the seal with the planar shape is over a portion of its length corresponding to the perpendicular side rigid support member.

6. The gasket assembly of claim 3 wherein the top sealing portion of the seal with the planar shape is over a portion of its length corresponding to the perpendicular side rigid support member.

7. The gasket assembly of claim 2 wherein the flange sections are integral.

\* \* \* \* \*